US012114140B2

(12) United States Patent
Nielsen

(10) Patent No.: US 12,114,140 B2
(45) **Date of Patent: *Oct. 8, 2024**

(54) HEARING DEVICE EARPIECE HAVING INTERMEDIATE MODULE

(71) Applicant: GN Hearing A/S, Ballerup (DK)

(72) Inventor: Mikkel Nielsen, Solrød Strand (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,938

(22) Filed: May 19, 2023

(65) Prior Publication Data

US 2023/0292048 A1 Sep. 14, 2023

Related U.S. Application Data

(63) Continuation of application No. 17/531,238, filed on Nov. 19, 2021, now Pat. No. 11,770,652.

(30) Foreign Application Priority Data

Nov. 30, 2020 (DK) ........................... PA 2020 70807

(51) Int. Cl.
*H04R 5/033* (2006.01)
*H04R 1/10* (2006.01)

(52) U.S. Cl.
CPC ........... *H04R 5/033* (2013.01); *H04R 1/1016* (2013.01); *H04R 1/1041* (2013.01); *H04R 1/1075* (2013.01)

(58) Field of Classification Search
CPC .... H04R 5/033; H04R 1/1016; H04R 1/1041; H04R 1/1075; H04R 2420/09;
(Continued)

(56) References Cited

U.S. PATENT DOCUMENTS 5,692,059 A 11/1997 Kruger
7,010,137 B1 * 3/2006 Leedom ............... H04R 25/456 381/328

(Continued)

FOREIGN PATENT DOCUMENTS

EP 3 343 952 A1 7/2018
EP 3 694 227 A1 8/2020

(Continued)

OTHER PUBLICATIONS

Non-Final Office Action for U.S. Appl. No. 17/531,238 dated Jan. 20, 2023.

(Continued)

*Primary Examiner* — Oyesola C Ojo
(74) *Attorney, Agent, or Firm* — Vista IP Law Group, LLP

(57) ABSTRACT

An earpiece having a longitudinal axis and having an earpiece housing comprising a proximal end and a distal end, a receiver located within the earpiece housing, a wire extending from the earpiece housing, the wire comprising a plurality of conductors including a ground conductor and a first conductor, and an intermediate module located within the earpiece housing, the intermediate module comprising a primary set of connector terminals and a secondary set of connector terminals, the primary set of connector terminals including wire connector terminals electrically connected to the plurality of conductors of the wire, and the secondary set of connector terminals comprising a first secondary connector terminal and a second secondary connector terminal, wherein the first secondary connector terminal and the second secondary connector terminal are each connected to a wire connector terminal of the primary set of connectors.

19 Claims, 4 Drawing Sheets

(58) Field of Classification Search
CPC ...... H04R 1/1091; H04R 25/609; H04R 1/04; H04R 2225/57; H04R 1/1058; H04R 2460/11; H04R 1/00; H04R 25/00
See application file for complete search history.

(56) References Cited

U.S. PATENT DOCUMENTS

| | | | | |
|---|---|---|---|---|
| 9,319,801 | B2 | 4/2016 | Gottschalk et al. | |
| 9,654,886 | B2 | 5/2017 | Barth et al. | |
| 11,381,898 | B2 * | 7/2022 | Choi | H04R 9/06 |
| 2006/0067555 | A1 * | 3/2006 | Tsai | H04R 1/1016 381/382 |
| 2007/0269073 | A1 * | 11/2007 | Huang | H04R 1/1016 381/190 |
| 2009/0052706 | A1 | 2/2009 | Gottschalk et al. | |
| 2010/0112948 | A1 * | 5/2010 | Wang | H04B 17/336 381/322 |
| 2011/0007929 | A1 * | 1/2011 | Rabu | H04R 1/1033 381/380 |
| 2011/0249856 | A1 * | 10/2011 | Takei | H04R 1/1016 381/380 |
| 2014/0003638 | A1 | 1/2014 | Barth et al. | |
| 2020/0260197 | A1 * | 8/2020 | Thomsen | H04R 25/505 |

FOREIGN PATENT DOCUMENTS

| | | | | |
|---|---|---|---|---|
| KR | 20010060457 | | 7/2001 | |
| KR | 20010060457 | A * | 7/2001 | H04R 1/10 |
| KR | 101423570 | | 7/2014 | |
| WO | WO 2018143679 | | 8/2018 | |
| WO | WO-2018143679 | A1 * | 8/2018 | H04R 1/06 |

OTHER PUBLICATIONS

Amendment Response to NFOA for U.S. Appl. No. 17/531,238 dated Apr. 10, 2023.

Notice of Allowance for U.S. Appl. No. 17/531,238 dated May 16, 2023.

Foreign 1st Technical Examination for Danish Patent Appln. No. PA 2020 70807 dated Feb. 16, 2021.

Extended European Search Report for EP Patent Appln. No. 21208726.6 dated Apr. 25, 2022.

* cited by examiner

HEARING DEVICE EARPIECE HAVING INTERMEDIATE MODULE

RELATED APPLICATION DATA

This application is a continuation of U.S. patent application Ser. No. 17/531,238 filed on Nov. 19, 2021, which claims priority to, and the benefit of, Danish Patent Application No. PA 2020 70807 filed on Nov. 30, 2020. The entire disclosures of the above applications are expressly incorporated by reference herein.

FIELD

The present disclosure relates to an earpiece for a hearing device and associated components.

BACKGROUND

Earpieces are used in a large variety of situations, where an audio signal is presented to the user via the earpiece. Further, earpieces are used in communication systems for presenting to and/or receiving audio signals from the user.

In two-part hearing devices with an earpiece and an external device, the earpiece is connected to the external device by a cable comprising one or more wires and/or a sound guiding channel.

Earpieces for hearing devices are typically worn for many hours and therefore wearing comfort is of key importance for a hearing device user, especially with the varying ear canal sizes of different users.

SUMMARY

Accordingly, there is a need for hearing devices and methods with improved fit and comfort. Further, there is a need for improved manufacturability of hearing devices to reduce overall costs to the consumers.

Disclosed herein is an earpiece having a longitudinal axis and comprising: an earpiece housing comprising a proximal end and a distal end; a receiver located within the earpiece housing; a wire extending from the earpiece housing, the wire comprising a plurality of conductors including a ground conductor and a first conductor; and an intermediate module located within the earpiece housing, the intermediate module comprising a primary set of connector terminals and a secondary set of connector terminals, the primary set of connector terminals including wire connector terminals electrically connected to the plurality of conductors of the wire, and the secondary set of connector terminals comprising a first secondary connector terminal and a second secondary connector terminal, wherein the first secondary connector terminal and the second secondary connector terminal are each connected to a wire connector terminal of the primary set of connectors.

It is an important advantage of the hearing device that the hearing device can be of a desirable and comfortable size for the user. It is also an important advantage of the hearing device to be easily to assemble and/or manufacture.

The present disclosure allows for improved assembly of hearing devices. In particular, components of the present disclosure could be manufactured/assembled as a single unit, and thus may be easily incorporated into different types of hearing devices without significant or any modification.

Moreover, the present disclosure allows for ease of assembly of hearing devices. As certain components have been incorporated together, it is therefore advantageously easier to manufacture the whole hearing device.

Further, the present disclosure allows for improved miniaturization of components of the hearing device, such as by incorporating a number of components into a single module. This can help improve fit, especially in users with smaller era canals. Additionally, this can improve the overall aesthetics of the hearing device as less components may be visible.

The present disclosure provides a hearing device with improved manufacturability, assembly, and miniaturization.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
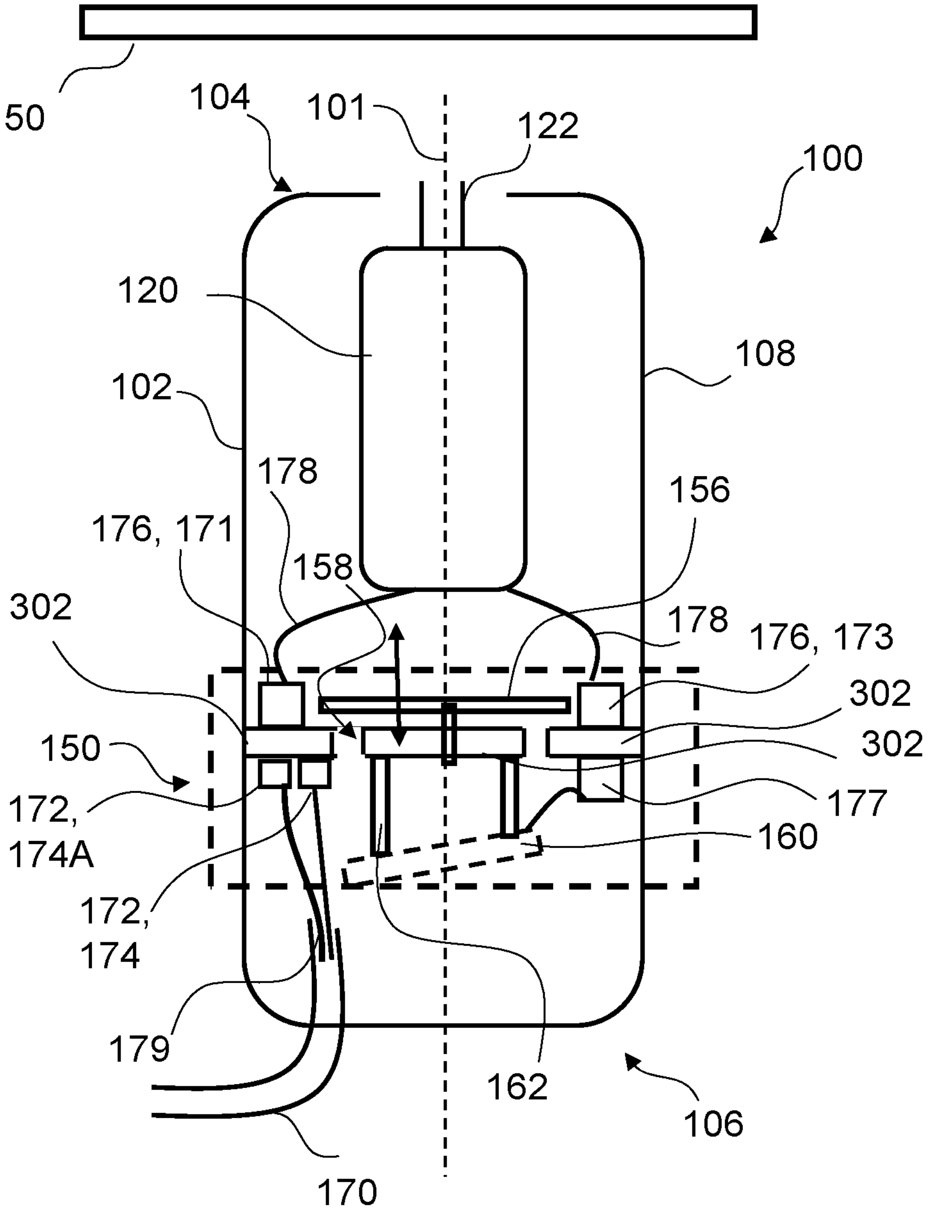
FIG. 1 schematically illustrates an exemplary earpiece.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn at an ear of a user and may be a hearable or a hearing aid, wherein the processor is configured to compensate for a hearing loss of a user.

The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid. The hearing device may comprise a first earpiece and a second earpiece, wherein the first earpiece and/or the second earpiece is an earpiece as disclosed herein.

Specifically, an earpiece for a hearing device is disclosed. The earpiece may be configured to be worn at least partially within an ear canal of a user and may be a hearable or a hearing aid, wherein the processor is configured to compensate for a hearing loss of a user.

As discussed herein, the proximal end can herein be seen as the end closest to an ear drum of the user when the earpiece is inserted into the ear of the user. The distal end of the earpiece can herein be seen as the end furthest away from an ear drum of the user when the earpiece is inserted into the ear of the user. A longitudinal axis may extend from the proximal end to the distal end (or generally from the proximal end to the distal end).

In one or more exemplary earpieces, the earpiece can include an earpiece housing. The earpiece housing may contain one or more components of the earpiece, such as electronic and/or processing and/or audio and/or data components discussed herein. An electronic connector, such as one or more wires, can extend from the earpiece to one or more other components of the hearing device outside of the ear canal, such as the behind-the-ear type hearing device. In alternative variations, the earpiece may be wirelessly connected to one or more other components outside of the ear canal.

The earpiece housing can have a proximal end (e.g., surface, portion, section, component). The earpiece housing can have a distal end (e.g., surface, portion, section, component). The earpiece housing can have an outer surface (e.g., surface, portion, section, component). The outer surface can connect the distal end to the proximal end. In one or more exemplary earpieces, the distal end and/or proximal end and/or connecting surface may be integrally formed. Alternatively, they may be separate components attached to one another, such as through mechanical or chemical attachment. The earpiece housing may be metal and/or plastic. The earpiece housing may be flexible. The earpiece housing may be rigid. The proximal end may have a sound outlet, or an outlet for sound to direct sound to a user's ear drum. The distal end may include an aperture (e.g., hole, empty space, opening, gap) for receiving a wire connected to another component of the hearing device. The distal end may not have an aperture.

In one or more exemplary earpieces, the outer surface may extend (or generally extend) along the longitudinal axis of the earpiece. In alternative earpieces, the outer surface may extend at an angle from the longitudinal axis of the earpiece. In some earpieces, the outer surface may include a number of components extending towards and/or away and/or along the longitudinal axis of the earpiece. Thus, the outer surface may have a regular or irregular surface. The outer surface can extend around an entire circumference of the earpiece housing. The outer surface can be any outer surface of the earpiece housing outside of the proximal end and the distal end. The outer surface may include ridges and/or gaps and/or slots and/or mating features. For example, the outer surface may mate with one or more of the domes as discussed herein.

The earpiece housing may have tabs and/or extensions and/or cavities and/or receiving surfaces and/or attaching surfaces and/or mating surfaces on an inner surface of the earpiece housing (such as on an inner surface of the proximal end and/or distal end and/or outer surface) for connecting the earpiece housing to further components of the earpiece and/or hearing device. The earpiece housing may have tabs and/or extensions and/or cavities and/or receiving surfaces and/or attaching surfaces and/or mating surfaces on an outer surface of the earpiece housing (such as on an outer surface of the proximal end and/or distal end and/or outer surface) for connecting the earpiece housing to further components of the earpiece and/or hearing device. For example, the earpiece housing may mate with one or more of the domes as discussed herein. Further, earpiece housing may include other components, such as a sound tube.

The earpiece housing may have electrical connections on an inner surface of the earpiece housing (such as on an inner surface of the proximal end and/or distal end and/or outer surface) for electrically connecting the earpiece housing to further components of the earpiece and/or hearing device. The earpiece housing may have electrical connections on an outer surface of the earpiece housing (such as on an outer surface of the proximal end and/or distal end and/or outer surface) for electrically connecting the earpiece housing to further components of the earpiece and/or hearing device.

The earpiece housing may contain one or more computer components for operating the earpiece. For example, power storage components and/or one or more processors and/or one or more microchips and/or one or more digital signal processors and/or circuit boards and/or wiring may be partially or fully contained within the earpiece housing.

In one or more exemplary earpieces, the earpiece housing may have a circular (or generally circular or substantially circular) cross section perpendicular to the longitudinal axis. In one or more exemplary earpieces, the earpiece housing may have an ovaloid (or generally ovaloid or substantially ovaloid) cross section perpendicular to the longitudinal axis. In one or more exemplary earpieces, the earpiece housing may have a rectangular (or generally rectangular or substantially rectangular) cross section perpendicular to the longitudinal axis. If a rectangular cross section is used, the cross section may include rounded corners or alternatively sharp corners. The cross section perpendicular to the longitudinal axis may have other polygonal shapes (symmetrical or asymmetrical) as well, and the particular cross-sectional shape of the earpiece housing is not limiting. Further, the cross section may vary in shape and/or dimensions along a longitudinal length of the earpiece, such as discussed below.

In one or more exemplary earpieces, the earpiece may include a receiver. The receiver may include a membrane. The receiver can have a receiver housing. The receiver and/or receiver housing may be fully or partially within the earpiece housing. The receiver may be electrically connected to one or more components in the hearing device, including the earpiece/intermediate module. The receiver and/or receiver housing may include a spout extending from the receiver housing. The spout may provide fluid communication between the receiver housing and outside of the earpiece housing. The spout may extend generally proximally from the receiver and/or receiver housing. The spout may remain within the earpiece housing. The spout may extend proximally beyond the earpiece housing. The spout may have a circular or ovaloid cross section, though the particular shape of the spout is not limiting.

In one or more exemplary earpieces, the earpiece may include a wire (e.g., cable, cord, power connector). The wire may extend from the earpiece housing. The wire may be attached to the earpiece housing. The wire may extend through an aperture (e.g., hole, empty space, opening, gap) on a distal end of the earpiece housing. The wire may extend through an aperture (e.g., hole, empty space, opening, gap) in the outer surface of the earpiece housing. The wire may be attached within the aperture. Thus, the wire may extend from the earpiece housing to outside of a user's ear canal.

The wire may provide electrical signal between the earpiece (such as components in the earpiece) and other components of the hearing device. For example, the wire may be connected to a behind the ear device. In addition or alternatively, the wire may provide power to the earpiece (such as components in the earpiece). In addition or alternatively, the wire may provide data to the earpiece from outside of the earpiece. In one or more exemplary earpieces, the wire can provide electrical signal and/or power and/or data to the earpiece.

The wire may be a single wire. The single wire can be wrapped in a non-conductive sheath. The wire may be a plurality of wires. The plurality of wires can be wrapped in a non-conductive sheath. The wire can include a conductor. The wire can include a plurality of conductors, e.g. in the range from 4 to 10 conductors. The conductor could be a ground conductor. The conductor could be a first conductor. The conductor could be a ground conductor and/or a first conductor. The wire can include further conductors as well, and the particular number and type of wire and/or conductors is not limiting.

In one or more exemplary earpieces, the wire can include a plurality of conductors within the wire. For example, the wire could include 1, 2, 3, 4, 5, 6, 7, 8, 9, or conductors. In one or more exemplary earpieces, the wire could include less than 2, 3, 4, 5, 6, 7, 8, 9, or 10 conductors. In one or more exemplary earpieces, the wire could include greater than 1, 2, 3, 4, 5, 6, 7, 8, 9, or 10 conductors. In one or more exemplary earpieces, the wire may be an NG8 wire.

In one or more exemplary earpieces, the earpiece can include an intermediate module (e.g., support, structure, scaffold, module, housing, container, component, part, device, mechanism). The intermediate module may be located partially or fully within the earpiece housing. The intermediate module may have a distal side (e.g., distal end, distal surface) and a proximal side (e.g., proximal end, proximal surface). The intermediate module may include a number of components, as discussed herein.

In one or more exemplary earpieces, the intermediate module may include a primary set of connector terminals (e.g., connectors, attachment points, electrical points, electrical attachments, conductive points). In one or more exemplary earpieces, the intermediate module may include a secondary set of connector terminals (e.g., connectors, attachment points, electrical points, electrical attachments, conductive points). In one or more exemplary earpieces, the intermediate module may include a primary set of connector terminals and/or a secondary set of connector terminals.

The primary set of connector terminals and/or the secondary set of connector terminals may be incorporated directly into the intermediate module. Alternatively, the primary set of connector terminals and/or the secondary set of connector terminals may be incorporated into intermediate components of the intermediate module. In one or more exemplary earpieces, the primary set of connector terminals and/or the secondary set of connector terminals may be incorporated onto the intermediate terminal itself and onto intermediate components. In one or more exemplary earpieces, the primary set of connector terminals can be electrically connected together.

In one or more exemplary earpieces, the primary set of connector terminals can include wire connector terminals. In one or more exemplary earpieces, the primary set of connector terminals can include one or more wire connector terminals, such as one or more of a first wire connector terminal, a second wire connector terminal, a third wire connector terminal, and a fourth wire terminal. The primary set of connector terminals can include at least three wire connector terminals, such as four, five or more wire terminals. The wire connector terminals can be electrically connected to the wire. The wire connector terminal can be a wire pad for the wire. For example, the wire connector terminals can be electrically connected to the plurality of conductors of the wire. In other words, each conductor of the wire may be electrically connected to a respective wire connector terminal of the intermediate module.

In one or more exemplary earpieces, a wire may not be used. Instead, the earpiece may contain a wireless module (e.g., transceiver, receiver, output, component, input). The wireless module may be located on the intermediate module. Thus, any reference to the wire connector terminal may also be utilized with respect to a wireless module if a wire is not used.

In one or more exemplary earpieces, the primary set of connector terminals can include a first primary connector terminal and/or a second primary connector terminal. A wire connector terminal of the primary set of connector terminals can be connected to the first primary connector terminal. The first primary connector terminal and/or the second primary connector terminal may be a connector pad. The first primary connector terminal and/or the second primary connector terminal may be a microphone connector pad. Thus, one or more of the first primary connector terminal and the second primary connector terminal may be configured to electrically connect with a microphone. The first primary connector terminal and/or the second primary connector terminal may be a vent mechanism terminal. Thus, one or more of the first primary connector terminal and the second primary connector terminal may be configured to electrically connect with a vent mechanism, such as discussed in detail below. One or more of the first primary connector terminal and the second primary connector terminal may be electrically connected with one or more of the first or second secondary connector terminals. The first primary connector terminal and/or the second primary connector terminal may each be connected to a respective wire connector terminal.

In one or more exemplary earpieces, the secondary set of connector terminals can include a first secondary connector terminal. The secondary set of connector terminals may include two, three, four, five, six or more connector terminals. In one or more exemplary earpieces, the secondary set of connector terminals can include a second secondary connector terminal. In one or more exemplary earpieces, the secondary set of connector terminals can include a first secondary connector terminal and/or a second secondary connector terminal. The first secondary connector terminal can be connected to a wire connector terminal of the primary set of connectors. The second secondary connector terminal can be connected to a wire connector terminal of the primary set of connectors. In one or more exemplary earpieces, the secondary set of connector terminals can be electrically interconnected.

The first secondary connector terminal may be a connector pad. The first secondary connector terminal may be a receiver connector pad. The first secondary connector terminal may be a photoplethysmogram (PPG) sensor connector. The first secondary connector terminal may be a vent mechanism terminal. Thus, one or more of the first secondary connector terminals may be configured to electrically connect with a vent mechanism. The first secondary connector terminal may be a receiver terminal. Thus, one or more of the first secondary connector terminals may be configured to electrically connect with a receiver.

The second secondary connector terminal may be a connector pad. The second secondary connector terminal may be a receiver connector pad. The second secondary connector terminal may be a PPG sensor connector. The second secondary connector terminal may be an vent mechanism terminal. Thus, one or more of the second secondary connector terminals may be configured to electrically connect with a vent mechanism.

In one or more exemplary earpieces, the secondary set of connector terminals can include a first secondary connector terminal. A wire connector terminal of the primary set of connector terminals can be connected to the first secondary connector terminal. The second secondary connector terminal may be a receiver terminal. Thus, one or more of the second secondary connector terminals may be configured to electrically connect with a receiver.

In one or more exemplary earpieces, the primary set of connector terminals can be solder pads. In one or more exemplary earpieces, the secondary set of connector terminals can be solder pads. In one or more exemplary earpieces, the primary set of connector terminals and the secondary set of connector terminals can be solder pads. Other connection methods can be used to connect components to the terminals. For example, the primary set of connector terminals and/or the secondary set of connector terminals may be plugs and/or connectors and/or slots.

In one or more exemplary earpieces, the primary set of connector terminals can include N connector terminals. In one or more exemplary earpieces, the secondary set of connector terminals can include M connector terminals. In one or more exemplary earpieces, N is larger than or equal to M. Alternatively, N is less than or equal to M. Alternatively, N is larger than M. Alternatively, N is less than M. Alternatively, N is equal to M.

In one or more exemplary earpieces, N is 1, 2, 3, 4, 5, 6, 7, 8, 9, or 10. In one or more exemplary earpieces, N is greater than 1, 2, 3, 4, 5, 6, 7, 8, 9, or 10. In one or more exemplary earpieces, N is less than 1, 2, 3, 4, 5, 6, 7, 8, 9, or 10.

In one or more exemplary earpieces, M is 1, 2, 3, 4, 5, 6, 7, 8, 9, or 10. In one or more exemplary earpieces, M is greater than 1, 2, 3, 4, 5, 6, 7, 8, 9, or 10. In one or more exemplary earpieces, M is less than 1, 2, 3, 4, 5, 6, 7, 8, 9, or 10.

In one or more exemplary earpieces, the primary set of connector terminals can be arranged on a distal side of the intermediate module. In one or more exemplary earpieces, the secondary set of connector terminals can be arranged on a distal side of the intermediate module. In one or more exemplary earpieces, the secondary set of connector terminals can be arranged on a proximal side of the intermediate module.

In one or more exemplary earpieces, a first of the primary set of connector terminals can be configured to receive a connection from the wire. Further, a second primary connector terminal of the primary set of connector terminals can be electrically connected to a microphone. The first and second of the primary set of connector terminals can be electrically connected so that data and/or power and/or electricity can pass from the wire to the microphone.

In one or more exemplary earpieces, first primary connector terminal and/or second primary connector terminal of the primary set of connector terminals are electrically connected to respective wire connector terminals of the primary set of connector terminals.

In one or more exemplary earpieces, a first secondary connector terminal of the secondary set of connector terminals can be electrically connected to a receiver. The first secondary connector terminal of the secondary set of connector terminals may be electrically connected to the first wire connector terminal of the primary set of connector terminals and/or the second wire connector terminal of the secondary set of connector terminals so that data and/or power and/or electricity can pass from the wire and/or the microphone to the receiver. A second secondary connector terminal of the secondary set of connector terminals may be grounded.

In one or more exemplary earpieces, first secondary connector terminal and second secondary connector terminal of the secondary set of connector terminals are electrically connected to respective wire connector terminals of the primary set of connector terminals.

The different connector terminals may be electrically connected to one another, or electrically isolated from one another, as desired by user for operation of different components of the earpiece. For example, power, data, or electrical energy can be provided between the different connector terminals.

In one or more exemplary earpieces, the intermediate module can include an electrical interface. In one or more exemplary earpieces, the intermediate module can include a printed circuit board (PCB). The circuit board can be a flex circuit board. The circuit board can be a rigid printed circuit board. The circuit board can include the primary set of connector terminals as discussed above. The circuit board can include the secondary set of connector terminals as discussed above. The primary set of connector terminals may be on opposite sides of the printed circuit board as the secondary set of connector terminals. Alternatively, the primary set of connector terminals may be on the same side of the printed circuit board as the secondary set of connector terminals.

In one or more exemplary earpieces, the circuit board can include a primary intermediate set of connector terminals. In one or more exemplary earpieces, the circuit board can include a secondary intermediate set of connector terminals. The primary intermediate set of connector terminals may be on opposite sides of the printed circuit board as the secondary intermediate set of connector terminals. Alternatively, the primary intermediate set of connector terminals may be on the same side of the printed circuit board as the secondary intermediate set of connector terminals.

In one or more exemplary earpieces, the primary intermediate set of connector terminals may be electrically connected to the primary set of connector terminals. In one or more exemplary earpieces, the secondary intermediate set of connector terminals may be electrically connected to the secondary set of connector terminals.

In one or more exemplary earpieces, the primary intermediate set of connector terminals may be electrically connected to the primary set of connector terminals. In one or more exemplary earpieces, the secondary intermediate set of connector terminals may be the secondary set of connector terminals.

In one or more exemplary earpieces, the primary intermediate set of connector terminals may be the primary set of connector terminals. In one or more exemplary earpieces, the secondary intermediate set of connector terminals may be electrically connected to the secondary set of connector terminals.

In one or more exemplary earpieces, the circuit board can have a body. The circuit board can have a proximal end and a distal end. The body can extend between the proximal end and the distal end. The circuit board can include electrical connections passing through and/or around the body to different components of the circuit board. In one or more exemplary earpieces, the body can extend across the earpiece housing. Thus, the outer circumference of the body can conform to an inner surface of the earpiece housing. The body can be mechanically attached to the earpiece housing. The body can be chemically attached to the earpiece housing. Thus, the body may be circular and/or ovaloid and/or rectangular and/or another geometric design in a cross section perpendicular to the longitudinal axis.

In one or more exemplary earpieces, the body can include one or more vents aperture (e.g., holes, empty spaces, openings, gaps, apertures). The body can include a plurality of vents. In one or more exemplary earpieces, the body can include 1, 2, 3, 4, 5, 6, 7, 8, 9, or 10 vents. In one or more exemplary earpieces, the body can include greater than 1, 2, 3, 4, 5, 6, 7, 8, 9, or 10 vents. In one or more exemplary earpieces, the body can include less than 2, 3, 4, 5, 6, 7, 8, 9, or 10 vents. The one or more vents can extend through a longitudinal thickness of the body (e.g., from the distal side to the proximal side).

One or more of the primary set of connector terminals can be electrically connected to one or more of the secondary set of connector terminals. For example, terminals on opposite sides of the printed circuit board may be electrically connected.

The intermediate module can include more than one printed circuit board, such as a plurality of printed circuit boards. The intermediate module can be formed of more than one printed circuit board, such as a plurality of printed circuit boards. One or more of the plurality of printed circuit boards may be electrically connected. One or more of the plurality of printed circuit boards can be electrically isolated from others of the plurality of printed circuit boards.

In one or more exemplary earpieces, the intermediate module can include a vent mechanism (e.g., vent, vent system, venting mechanism, vent configuration, vent module, vent component). Thus, the intermediate module can include a vent mechanism configured for provision of allowing in a first state and preventing in a second state fluid communication between a proximal side and a distal side of the intermediate module.

The vent mechanism may be an active vent mechanism. Therefore, the vent mechanism can be configured to open and close a vent path (e.g., vent pathway, air path, sound path, fluid path, fluid communication). The vent mechanism can be open in a first state. The vent mechanism can be closed in a second state.

The opening and closing may be done by moving one or more components of the vent mechanism of the intermediate module. The vent path can pass at least partially through the earpiece housing. The vent mechanism can include any mechanical mechanism that opens and closes a vent path. In one or more exemplary earpieces, the vent mechanism may be operated electronically and/or automatically and/or manually and/or mechanically. For example, the vent mechanism may be operated via a piston and/or a moveable arm. The opening and closing of the vent mechanism may not be audible to the user.

In one or more exemplary earpieces, the circuit board can form a portion of the vent mechanism. For example, the circuit board can extend across the earpiece housing. Thus, the outer circumference of the circuit board can conform to an inner surface of the earpiece housing. The circuit board can be mechanically attached to the earpiece housing. The circuit board can be chemically attached to the earpiece housing.

As mentioned above, the circuit board can include one or more vents aperture (e.g., holes, empty spaces, openings, gaps, apertures). The circuit board can include a plurality of vents. In one or more exemplary earpieces, the circuit board can include 1, 2, 3, 4, 5, 6, 7, 8, 9, or 10 vents. In one or more exemplary earpieces, the circuit board can include greater than 1, 2, 3, 4, 5, 6, 7, 8, 9, or 10 vents. In one or more exemplary earpieces, the circuit board can include less than 2, 3, 4, 5, 6, 7, 8, 9, or 10 vents. The one or more vents can extend through a longitudinal thickness of the circuit board (e.g., from the distal side to the proximal side).

Without the one or more vents, air would not be able to pass through the earpiece housing as the circuit board would block the path from the proximal end of the housing to the distal end of the housing. Thus, the vent can provide a vent path through the earpiece housing.

In one or more exemplary earpieces, the circuit board can include mating features.

The vent mechanism can include a plug (e.g., shield, plate, surface, blocker, stopper) that can move in the earpiece housing. For example, it can move longitudinally along the longitudinal axis of the earpiece. The plug can form an airtight seal with the circuit board when in the closed position, blocking the one or more vents and thus closing a vent path. When the plug is moved away from the circuit board, regardless of the type of motion, the vent path is opened. The plug may be flat. The plug may include an extension that fits within an one or more vents of the circuit board. The plug may include corresponding mating features to mate with the mating features of the circuit board. The plug and/or circuit board may include a sealing material for improving sealing between the plug and circuit board.

Other vent mechanisms can be used as well, and the particular vent mechanism is not limiting. For example, the vent mechanism can include rotational components. Alternatively, the vent mechanism can include translational components. In one or more exemplary earpieces, the vent mechanism can include both rotational and translatable components.

The vent mechanism is generally used to open and close the vent path. When the vent mechanism is open, the vent mechanism allows sound to pass through the earpiece and/or earpiece housing between a proximal end and a distal end of the earpiece. When closed, the vent mechanism prevents sound from passing through the earpiece between a proximal end and a distal end of the earpiece. Thus, the vent mechanism can prevent fluid communication when closed.

This opening and closing can advantageously allow for improved sound quality when a user is listening to music. For example, the vent mechanism can be closed so that a user can experience improved bass hearing, in particular during music playback. However, this may reduce the sound received from the environment when the vent is closed.

When the user desires to hear the surrounding environment, the vent mechanism can be opened to provide audio input of the surroundings to the user. This may reduce the clarity of one or more sound levels to the user which may not be necessary or desirable for environmental hearing.

In one or more exemplary earpieces, the vent path can include a first set of first vent apertures (e.g., holes, empty spaces, openings, gaps, one or more apertures) and a second set of second vent apertures (e.g., holes, empty spaces, openings, gaps, one or more apertures), both of which are configured to provide fluid communication between the earpiece housing and outside the earpiece housing. The first set of first vent apertures can be longitudinally separated from the second set of second vent apertures via the intermediate module. Therefore, closing the venting mechanism will stop fluid flow through the earpiece housing between the first set of first vent apertures and the second set of second vent apertures.

In one or more exemplary earpieces, the first set of first vent apertures can be located on the outer surface of the earpiece housing. In one or more exemplary earpieces, the first set of first vent apertures can be located on the distal end of the earpiece housing.

In one or more exemplary earpieces, the second set of second vent apertures can be located on the outer surface of the earpiece housing. In one or more exemplary earpieces, the second set of first vent apertures can be located on the proximal end of the earpiece housing.

Advantageously, the vent mechanism can be arranged distal to the receiver, instead of aligned with or proximal to the receiver. In one or more exemplary earpieces, the vent mechanism can be arranged proximal to the microphone. As the vent mechanism may need to be of a particular dimension to properly allow for the vent path, the earpiece can be constrained in size by the vent mechanism (e.g., the shrinking of the earpiece may be limited by the dimensions of the vent mechanism). However, by moving the vent mechanism distal to the receiver (e.g., farther from the ear drum), the dimensions of the earpiece housing proximal to the vent mechanism may be reduced, such as in diameter. This can improve fit with a user, especially those who have smaller ear canals, so that the earpiece can be properly held within a user's ear canal. Further, the reduction in size may allow for the earpiece to be placed further into a user's ear canal, allowing for less of the earpiece to show outside the user's ear and thus improve aesthetics.

In one or more exemplary earpieces, the earpiece housing may have two different diameters, a distal section diameter and a proximal section diameter. The proximal section diameter may be smaller than the distal section diameter. The distal section may be defined as the earpiece housing aligned with and distal to the vent mechanism. The proximal section may be defined as the earpiece housing proximal to the vent mechanism.

The distal section may be 10, 20, 30, 40, 50, 60, or 70% of a longitudinal length of the earpiece housing. The distal section may be greater than 10, 20, 30, 40, 50, 60, or 70% of a longitudinal length of the earpiece housing. The distal section may be less than 10, 20, 30, 40, 50, 60, or 70% of a longitudinal length of the earpiece housing.

The proximal section may be 10, 20, 30, 40, 50, 60, or 70% of a longitudinal length of the earpiece housing. The proximal section may be greater than 10, 20, 30, 40, 50, 60, or 70% of a longitudinal length of the earpiece housing. The proximal section may be less than 10, 20, 30, 40, 50, 60, or 70% of a longitudinal length of the earpiece housing.

For example, the proximal section diameter may be 5, 10, 15, 20, 25, 30, 35, 40, 45, or 50% smaller than the distal section diameter. The proximal section diameter may be greater than 5, 10, 15, 20, 25, 30, 35, 40, 45, or 50% of the distal section diameter. The proximal section diameter may be less than 5, 10, 15, 20, 25, 30, 35, 40, 45, or 50% of the distal section diameter.

In one or more exemplary earpieces, the proximal section diameter of the earpiece housing may be 0.7, 0.6, 0.5, 0.4, 0.3, 0.2, or 0.1 cm. In one or more exemplary earpieces, the proximal section diameter of the earpiece housing may be less than 0.7, 0.6, 0.5, 0.4, 0.3, 0.2, or 0.1 cm. In one or more exemplary earpieces, the proximal section diameter of the earpiece housing may be greater than 0.7, 0.6, 0.5, 0.4, 0.3, 0.2, or 0.1 cm.

In one or more exemplary earpieces, the distal section diameter of the earpiece housing may be 0.7, 0.6, 0.5, 0.4, 0.3, 0.2, or 0.1 cm. In one or more exemplary earpieces, the distal section diameter of the earpiece housing may be less than 0.7, 0.6, 0.5, 0.4, 0.3, 0.2, or 0.1 cm. In one or more exemplary earpieces, the distal section diameter of the earpiece housing may be greater than 0.7, 0.6, 0.5, 0.4, 0.3, 0.2, or 0.1 cm.

The change in dimension from the distal section diameter to the proximal section diameter of the earpiece housing may be in the form of a taper and/or multiple tapers (e.g., tapered). The change in dimension from the distal section diameter to the proximal section diameter may be in the form of a step and/or multiple steps (e.g., stepped). Further, the earpiece housing may include one or more steps and one or more tapers. In one or more exemplary earpieces, the earpiece housing may both reduce in diameter and increase in diameter along a length of the earpiece.

By reducing a diameter of the proximal section, this can allow for an easier fit of the earpiece into a user with a smaller ear canal. This can greatly improve the comfort and effectiveness of the hearing device. Further, the reduction in size can allow the earpiece to be place farther into the ear canal, which means less of the earpiece extends outside of the user's ear, thereby increasing aesthetics of the hearing device.

As discussed, a vent path may be formed though at least a portion of the earpiece housing. The vent path may be construed as a fluid communication path (such as for the movement of air during auditory signaling). The vent path may be open and closed via the vent mechanism as discussed above.

Accordingly, the vent mechanism can open and close to prevent air (e.g., sound, fluid, venting) from passing through the earpiece, specifically the circuit board. However, even when the vent mechanism is in the closed position, electricity and/or data can pass through the intermediate module, including the circuit board. For example, electricity and/or data can pass from the proximal side of the intermediate module and/or the circuit board to the distal side of the intermediate module and/or the circuit board, regardless of whether the vent mechanism is in the open or closed position. As an example, electricity and/or data can pass from the primary set of connector terminals to the secondary set of connector terminals.

In one or more exemplary earpieces, the intermediate module can include and/or be associated with a microphone or a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The microphone may be at an angle from the longitudinal axis of the earpiece (e.g., tilted at an angle). In one or more exemplary earpieces, the microphone may be tilted by 5, 10, 15, 20, 25, 30, 35, 40, 45, 50, 55, 60, 65, 70, 75, 80, 85, or 90 degrees from the longitudinal axis. In one or more exemplary earpieces, the set of microphones may be tilted by greater than 5, 10, 15, 20, 25, 30, 35, 40, 45, 50, 55, 60, 65, 70, 75, 80, 85, or 90 degrees from the longitudinal axis. In one or more exemplary earpieces, the microphone may be tilted by less than 5, 10, 15, 20, 25, 30, 35, 40, 45, 50, 55, 60, 65, 70, 75, 80, 85, or 90 degrees from the longitudinal axis.

The microphone may be associated with the intermediate module, such as the circuit board, in a number of ways, none of which are limiting to the disclosure.

In one or more exemplary earpieces, the intermediate module, for example the circuit board, can include a microphone seat (e.g., space, recess, indent, location, gap). The microphone seat can be configured to receive a microphone. Thus, the intermediate module can include a microphone within the seat (e.g., within the microphone seat). In alternative earpieces, the intermediate module and/or the circuit board may not include a microphone seat, and the microphone can be directly attached to the intermediate module and/or the circuit board. The microphone can be attached on a distal end of the intermediate module. The microphone can be attached on a distal end of the circuit board. The microphone can be attached on a proximal end of the intermediate module. The microphone can be attached on a distal end of the circuit board.

In one or more exemplary earpieces, the microphone can be attached to the circuit board directly. For example, the microphone can be snap fit into the microphone seat. Alternatively, the microphone may be chemically adhered to the circuit board, such as via gluing or epoxy.

In one or more exemplary earpieces, the microphone can be indirectly attached to the circuit board. The microphone can be longitudinally spaced apart from the circuit board and attached via one or more mechanical connectors (e.g., arms, legs, connectors, poles, walls, posts, extensions). The mechanical connector can act as a microphone seat.

The mechanical connector can be mechanically attached to the circuit board. The mechanical connector can be integral with the circuit board. The mechanical connector can be chemically attached to the circuit board.

The mechanical connector can be mechanically attached to the microphone. The mechanical connector can be integral with the microphone. The mechanical connector can be chemically attached to the microphone.

The microphone seat can be configured to conform to a microphone. The microphone may be removable from the microphone seat. The microphone may be snap fit into the microphone seat. The microphone can be mechanically attached into the microphone seat. The microphone can be chemically attached into the microphone seat. The microphone can, for example, be glued or epoxied to the intermediate module.

In one or more exemplary earpieces where the microphone is attached to a distal side of the intermediate module, whether directly attached or in a seat, the circuit board and/or the mechanical connectors can be shaped to conform with a flat surface of the microphone. For example, if the microphone was tilted/angled with respect to the longitudinal axis, a distal surface of the circuit board and/or mechanical connectors may be tilted/angled in a similar manner to conform with the angle of the microphone.

In one or more exemplary earpieces, the intermediate module may include a microphone housing. The microphone housing can be attached to the circuit board. For example, the microphone housing can be attached to a distal end of the circuit board. The microphone can be located in the microphone housing.

Advantageously, by associating the microphone with the intermediate module, a microphone unit can be formed. This microphone unit can fit with a number of different earpieces, thus allowing for the microphone unit to be separately manufactured and inserted into a number of different types of earpieces. This improves manufacturability of the earpieces, and allows for easier modular design as the microphone unit would not need to be modified for different earpiece designs.

Further, associating the microphone with the intermediate module can provide for a single unit, which lowers the total parts necessary, improving manufacturability and assembly.

Further, by associating the microphone with the intermediate module, it can be easier to miniaturize the assembly.

In one or more exemplary earpieces, the microphone may be distal to the venting mechanism. Specifically, if the venting mechanism were closed, a user would still be able to utilize the microphone.

In one or more exemplary earpieces, the wire can extend from the distal end of the earpiece housing and the microphone can be located on a distal side of the intermediate module.

In one or more exemplary earpieces, the intermediate module can include and/or be associated with a receiver or a set of receivers. The set of receivers may comprise one or more receivers. The set of receivers comprises a first receiver for provision of a first receiver input signal and/or a second receiver for provision of a second receiver input signal. The set of receivers may comprise N receivers for provision of N receiver signals, wherein N is an integer in the range from 1 to 10. In one or more exemplary hearing devices, the number N of receivers is two, three, four, five or more. The set of receivers may comprise a third receiver for provision of a third receiver input signal.

The receiver may be associated with the intermediate module, such as the circuit board, in a number of ways, none of which are limiting to the disclosure.

In one or more exemplary earpieces, the intermediate module, for example the circuit board, can include a receiver seat (e.g., space, recess, indent, location, gap). The receiver seat can be configured to receive a receiver. Thus, the intermediate module can include a receiver within the seat (e.g., within the receiver seat). In alternative earpieces, the intermediate module and/or the circuit board may not include a receiver seat, and the receiver can be directly attached to the intermediate module and/or the circuit board. The receiver can be attached on a distal end of the intermediate module, such as the circuit board. The receiver can be attached on a proximal end of the intermediate module, such as the circuit board.

In one or more exemplary earpieces, the receiver can be attached to the circuit board directly. For example, the receiver can be snap fit into the receiver seat. Alternatively, the receiver may be chemically adhered to the circuit board.

In one or more exemplary earpieces, the receiver can be indirectly attached to the circuit board. The receiver can be longitudinally spaced apart from the circuit board and attached via one or more mechanical connectors (e.g., arms, legs, connectors, poles, walls, posts, extensions). The mechanical connector can act as a receiver seat.

The mechanical connector can be mechanically attached to the circuit board. The mechanical connector can be integral with the circuit board. The mechanical connector can be chemically attached to the circuit board.

The mechanical connector can be mechanically attached to the receiver. The mechanical connector can be integral with the receiver. The mechanical connector can be chemically attached to the receiver.

The receiver seat can be configured to conform to a receiver. The receiver may be removable from the receiver seat. The receiver may be snap fit into the receiver seat. The receiver can be mechanically attached into the receiver seat. The receiver can be chemically attached into the receiver seat. The receiver can, for example, be glued or epoxied to the intermediate module.

In one or more exemplary earpieces, the intermediate module may include a receiver housing. The receiver housing can be attached to the circuit board. For example, the receiver housing can be attached to a proximal end of the circuit board. The receiver can be located in the receiver housing.

Advantageously, by associating the receiver with the intermediate module, a receiver unit can be formed. This receiver unit can fit with a number of different earpieces, thus allowing for the receiver unit to be separately manufactured and inserted into a number of different types of earpieces. This improves manufacturability of the earpieces, and allows for easier modular design as the microphone unit would not need to be modified for different earpiece designs.

Further, associating the receiver with the intermediate module can provide for a single unit, which lowers the total parts necessary, improving manufacturability and assembly.

Further, by associating the receiver with the intermediate module, it can be easier to miniaturize the assembly.

In one or more exemplary earpieces, the receiver may be proximal to the venting mechanism. Specifically, if the venting mechanism were closed, a user would still be able to utilize the microphone.

In one or more exemplary earpieces, the receiver can be integrally formed into the intermediate module. For example, the receiver can be integrally formed with the circuit board.

In one or more exemplary earpieces, the intermediate module may contain a circuit board and/or a primary set of connector terminals and/or a secondary set of connector terminals and/or a vent mechanism. In one or more exemplary earpieces, the intermediate module may contain a microphone seat and/or a microphone. The microphone may be attached directly to the circuit board or via one or more mechanical connectors. In one or more exemplary earpieces, the intermediate module may contain a receiver seat and/or a receiver. The receiver may be attached directly to the circuit board or via one or more mechanical connectors.

In any of the above-discussed exemplary earpieces, the earpiece can include one or more domes (e.g., circle, oval, skirts, cones, holders, fitters) extending radially away from the outer surface of the earpiece housing. The one or more domes may extend partially or fully around an outer circumference of the earpiece housing and/or components extending from the earpiece housing. The one or more domes can be integrally formed with the earpiece housing and/or components extending from the earpiece housing. Alternatively, the one or more domes can be attached to the earpiece housing and/or components extending from the earpiece housing. For example, they can be attached to the outer surface. Alternatively, they can be attached to the proximal end and/or the distal end. Alternatively, they can be attached to the outer surface and/or the distal end and/or the proximal end. The one or more domes may extend proximally and/or distally beyond the earpiece housing and/or components extending from the earpiece housing.

The one or more domes may be flexible. The one or more domes may be rigid. The one or more domes may be formed from plastic and/or silicone. The one or more domes may be configured to press against an inner surface of a user's ear canal. The one or more domes can conform to a user's ear canal. Thus, the one or more domes may provide a fit for an earpiece in the user's ear canal. This can prevent unwanted motion of the earpiece within the owner's ear. The one or more domes may be generally circular and/or ovaloid in cross-sectional shape. In one or more exemplary earpieces, the one or more domes can be conically formed, such as opening in a proximal direction. In one or more exemplary earpieces, the one or more domes can be conically formed, such as opening in a distal direction.

In one or more exemplary earpieces, the earpiece can include a single dome. In one or more exemplary earpieces, the earpiece can include multiple domes. If multiple domes are used, they may be separate or connected.

In one or more exemplary earpieces, a first dome and a second dome can be connected, thereby forming a combined dome. They can be connected by a connector. In one or more exemplary earpieces, the connector can include an aperture or can block fluid communication. For example, the first dome and the second dome can be connected by a cylindrical part. In one or more exemplary earpieces, a combined dome can include multiple dome parts, such as a first dome part and a second dome part. The combined dome can include further dome parts as well, such as a third, fourth, or fifth dome part. The first dome part can be proximal to the second dome part. The first dome part may overlap the second dome part in the longitudinal direction. The first dome part may not overlap the second dome part in the longitudinal direction.

One or more of the domes may block fluid flow through a longitudinal thickness of the domes. In one or more exemplary earpieces, one or more of the domes may have an aperture to allow fluid communication between longitudinal sides. For example, a proximalmost dome may include an aperture.

The hearing device and/or earpiece may be configured for wireless communication with one or more devices, such as with another hearing device, e.g. as part of a binaural hearing system, and/or with one or more accessory devices, such as a smartphone and/or a smart watch. The hearing device and/or earpiece optionally comprises an antenna for converting one or more wireless input signals, e.g. a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device and/or earpiece optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device and/or earpiece may comprise a plurality of antennas and/or an antenna may be configured to be operate in one or a plurality of antenna modes. The transceiver input signal optionally comprises a first transceiver input signal representative of the first wireless signal from a first external source.

The hearing device and/or earpiece optionally comprises a pre-processing unit. The pre-processing unit may be connected to the radio transceiver for pre-processing the transceiver input signal. The pre-processing unit may be connected the first microphone for pre-processing the first microphone input signal. The pre-processing unit may be connected the second microphone if present for pre-processing the second microphone input signal. The pre-processing unit may comprise one or more A/D-converters for converting analog microphone input signal(s) to digital pre-processed microphone input signal(s).

The hearing device and/or earpiece optionally comprises a processor for processing input signals, such as pre-processed transceiver input signal and/or pre-processed microphone input signal(s). The processor provides an electrical output signal based on the input signals to the processor.

Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

FIG. 1 shows an exemplary earpiece, such as for a hearing device. The earpiece 100 can fit within an ear canal of a user. As shown, the earpiece can include a proximal end 104 nearest the ear drum 50, a distal end 106, and a longitudinal axis 101 extending between the proximal end 104 and distal end 106. The proximal end 104 and distal end 106 can be connected via an outer surface 108, thereby forming an earpiece housing 102.

As shown, the earpiece housing 102 can contain a receiver 120. The receiver may have a spout 122 extending proximally from the receiver 120 which can provide fluid (e.g., audio) communication between the receiver 122 and a volume proximal to the earpiece housing 102.

Further, the earpiece 100 can include an intermediate module 150, which can include a number of components. As shown, the intermediate module 150 can include a circuit board 302. The circuit board can have a primary set of connectors 172 on a distal side of the circuit board 302 and a secondary set of connector terminals 173 on a proximal side of the circuit board 302. The primary set of connector terminals 172 can include a wire connector terminal 174 for connecting to wire conductors 179 of a wire 170. The intermediate module 150 comprises a primary set of connector terminals 172 including a first wire connector terminal 174 and a second wire connector terminal 174A, and optionally a third wire connector (not shown) electrically connected to respective first conductor, second conductor, and third conductor of the wire 170. The wire 170 may extend through a distal end 106 of the earpiece housing 102. The secondary set of connector terminals 176 can include a first secondary connector terminal 171 and a second secondary connector terminal 173. The terminals may be interconnected, or connected to other components, via electrical conductors 178. For example, one or more of the primary set of connectors 172, such as first primary connector 177, can be electrically connected to a microphone 160 and a wire connector terminal of the primary set of connectors. One or more of the secondary set of connectors 176, such as first secondary connector terminal 171 and/or second secondary connector terminal 173 can be electrically connected to a receiver 120.

As shown, the circuit board 302 can also include one or more vents 158 extending from a proximal side to a distal side of the circuit board 302. The intermediate module 150 can further include a vent mechanism 156 configured to translate away from and towards the circuit board 302 to open and close a vent path, via vents 158, through the earpiece housing 102. Specifically, the intermediate module 150 can include a vent mechanism 156 configured for provision of allowing in a first state and preventing in a second state fluid communication between a proximal side and a distal side of the circuit board 302, and thus the intermediate module 150.

The intermediate module 150 may be include and/or be associated with a microphone 160. As shown, the microphone 160 can be connected to the circuit board 302 via one or more mechanical connectors 162. The mechanical connectors 162 may act as a microphone seat configured to receive the microphone 160. As shown, the microphone 160 is located distal to the vent mechanism 156.

Figure 2:
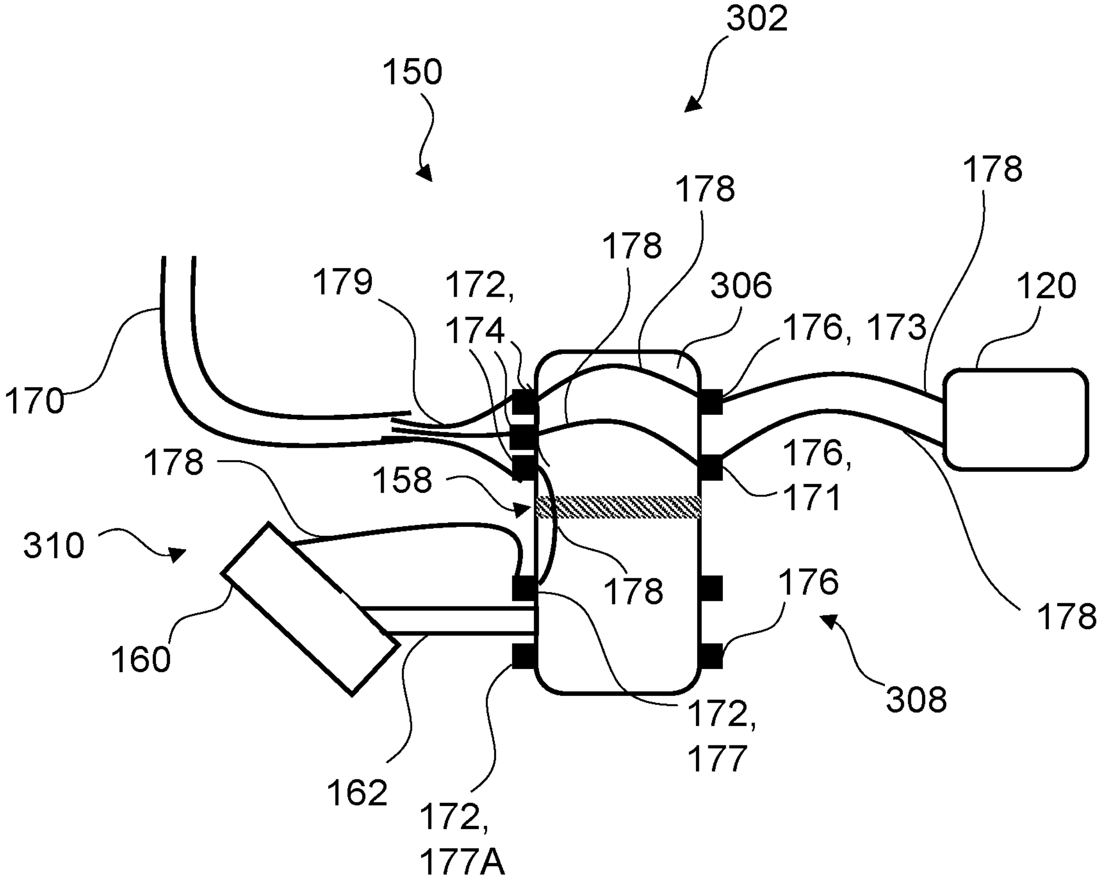
FIG. 2 schematically illustrates an exemplary intermediate module.

FIG. 2 schematically illustrates an exemplary intermediate module 150. The intermediate module 150 may be within the earpiece housing 102.

The intermediate module 150 can include a circuit board 302, such as a printed circuit board. As shown, the circuit board 302 can have a body 306, the body 306 having a proximal side 308 and a distal side 310. The circuit board 302 can have a vent 156 that extend through the body 306 from the distal side 310 to the proximal side 308.

The distal end or side 310 of the circuit board 302 can include the primary set of connector terminals 172, such as the wire connector terminal 174 that can connect to wire 170. The proximal end or side 308 of the circuit board 302 can include the secondary set of connector terminals 176, such as the first secondary connector terminal 171 and the second secondary connector terminal 173. The circuit board 302 can further include electrical conductors 178 which can connect different terminals on the circuit board 302. As shown, the primary set of connector terminals 172 may include a first primary connector terminal 177 and the wire connector terminals 174 of the primary set of connector terminals 172 are connected to the first primary connector terminal 177 and connector terminals of the secondary set of connector terminals.

As shown in FIG. 2, the primary set of connector terminals 172, such as first primary connector terminal 177, may electrically connect to the microphone 160. The microphone 160 may be attached to the circuit board 302, specifically the distal end 310 of the body 306, via mechanical connector 162. Further, the secondary set of connector terminals 176 may connect to the receiver 120.

Figure 3A:
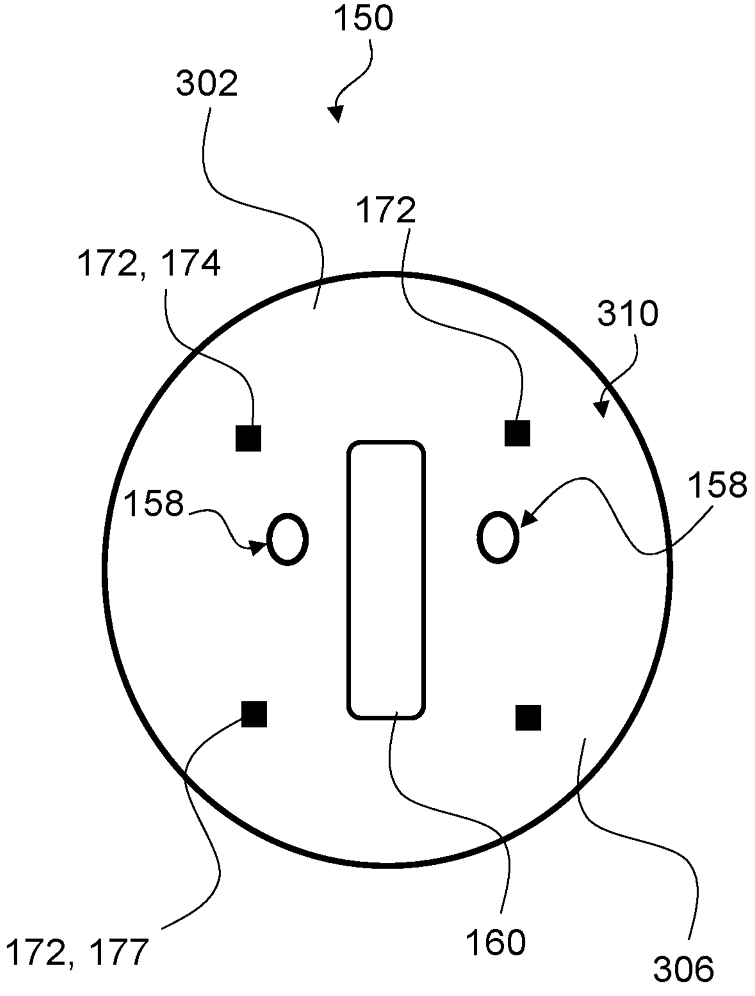
FIG. 3A schematically illustrates an exemplary intermediate module.

FIG. 3A illustrates a distal end 310 of the circuit board 302 of the intermediate module 150. As shown, the distal end 310 may contain the primary set of connector terminals 172 (including one or more wire connector terminals 174) and one or more vents 158 passing through a thickness of the body 306. Outside of vents 158, the circuit board 302 can prevent fluid communication between the distal 106 and proximal 104 ends of the earpiece housing 102. Further, the distal end 310 may include microphone 160.

Figure 3B:
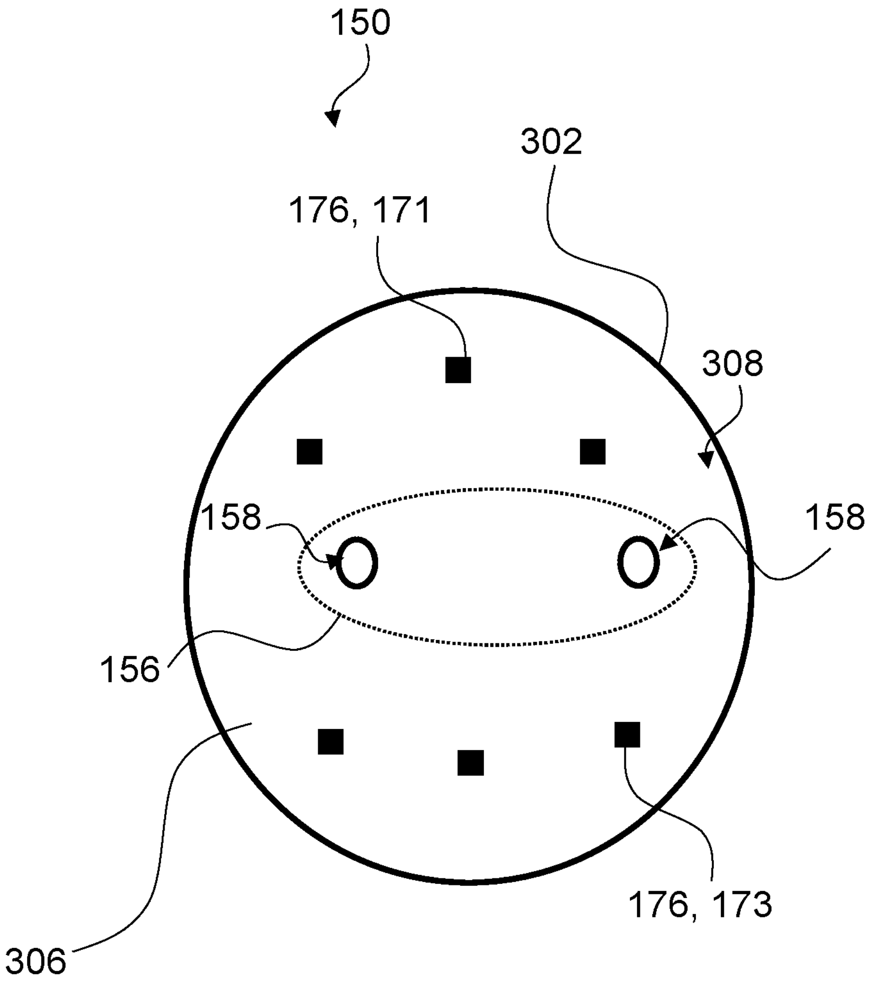
FIG. 3B schematically illustrates an exemplary intermediate module.

FIG. 3B illustrates a proximal end 308 of the circuit board 302 of the intermediate module 150. As shown, the proximal end can contain the secondary set of connector terminals 176 (including a first secondary connector terminal 171 and a second secondary connector terminal 173) and one or more vents 158 passing through a thickness of the body 306. Further, the proximal end 308 of the circuit board 302 may contain the vent mechanism 156 which can be used to open or close the vents 158, thereby allowing or preventing fluid communication through the earpiece. One or more connector terminals of the secondary set of connector terminals 176 on the proximal end 308 may be electrically connected to one or more connector terminals of the primary set of connector terminals 172 of the distal end 310.

It will be understood that not all electrical connections have not been shown in the above figures, and the disclosure should not be limited to the particular electrical connections shown in the figures above.

Examples of hearing devices and/or earpieces for hearing devices according to the disclosure are set out in the following items:

Item 1. An earpiece having a longitudinal axis and comprising:

an earpiece housing comprising a proximal end and a distal end;

a receiver located within the earpiece housing;

a wire extending from the earpiece housing, the wire comprising a plurality of conductors including a ground conductor and a first conductor; and an intermediate module located within the earpiece housing, the intermediate module comprising a primary set of connector terminals and a secondary set of connector terminals, the primary set of connector terminals including wire connector terminals electrically connected to the plurality of conductors of the wire, and the secondary set of connector terminals comprising a first secondary connector terminal and a second secondary connector terminal, wherein the first secondary connector terminal and the second secondary connector terminal are each connected to a wire connector terminal of the primary set of connectors.

Item 2. Earpiece according to Item 1, wherein the primary set of connector terminals and the secondary set of connector terminals comprise solder pads.

Item 3. Earpiece according to any one of the preceding Items, wherein the intermediate module comprises a microphone seat configured to receive a microphone or comprises a microphone integrally formed into the intermediate module.

Item 4. Earpiece according to Item 3, further comprising a microphone within the seat.

Item 5. Earpiece according to Item 4, wherein the wire extends from the distal end of the earpiece housing, and wherein the microphone is located on a distal side of the intermediate module.

Item 6. Earpiece according to any one of Items 4-5, wherein the microphone is at an angle with respect to the longitudinal axis.

Item 7. Earpiece according to any one of the preceding Items, wherein the intermediate module comprises a printed circuit board comprising the primary set of connector terminals and the secondary set of connector terminals.

Item 8. Earpiece according to any one of the preceding Items, wherein the intermediate module comprises a vent mechanism configured for provision of allowing in a first state and preventing in a second state fluid communication between a proximal side and a distal side of the intermediate module.

Item 9. Earpiece according to any one of Items 1-8, wherein the primary set of connector terminals is arranged on a distal side of the intermediate module and the secondary set of connector terminals is arranged on a proximal side of the intermediate module.

Item 10. Earpiece according to any one of the preceding Items, wherein the primary set of connector terminals comprises N connector terminals and the secondary set of connector terminals comprises M connector terminals, and wherein N is larger than or equal to M.

Item 11. Earpiece according to any one of the preceding Items, wherein the primary set of connector terminals comprises a first primary connector terminal, and wherein a wire connector terminal of the primary set of connector terminals is connected to the first primary connector terminal.

Item 12. Earpiece according to any one of the preceding Items, wherein the intermediate module comprises a receiver seat for receiving the receiver.

Item 13. Earpiece according to any one of the preceding Items, wherein the receiver is integrally formed into the intermediate module.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-3B comprise some modules or operations which are illustrated with a solid line and some modules or operations which are illustrated with a dashed line. The modules or operations which are comprised in a solid line are modules or operations which may be comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

50 ear drum
100 earpiece
101 longitudinal axis
102 earpiece housing
104 proximal end
106 distal end
108 outer surface
120 receiver
122 spout
150 intermediate module
156 vent mechanism
158 vent, vent aperture
160 microphone
162 mechanical connector
170 wire
171 first secondary connector terminal
172 primary set of connector terminals
173 second secondary connector terminal
174 wire connector terminal, first wire connector terminal
174A second wire connector terminal
176 secondary set of connector terminals
177 first primary connector terminal
177A second primary connector terminal
178 electrical conductor
179 wire conductor
302 circuit board
306 body
308 proximal end
310 distal end

The invention claimed is:

1. An earpiece, comprising:
- an earpiece housing comprising a first end and a second end;
- a receiver located in the earpiece housing;
- an elongate member extending from the earpiece housing, the elongate member comprising a plurality of conductors including a first conductor; and
- an intermediate module located within the earpiece housing, the intermediate module comprising a primary set of N connector terminals and a secondary set of M connector terminals, the primary set of N connector terminals including a wire connector terminal electrically connected to the first conductor of the elongate member, wherein the secondary set of M connector terminals comprises a first secondary connector terminal and a second secondary connector terminal;
- wherein N is larger than or equal to M.

2. The earpiece according to claim 1, wherein the primary set of N connector terminals and the secondary set of M connector terminals comprise solder pads.

3. The earpiece according to claim 1, wherein the intermediate module comprises a microphone seat configured to receive a microphone.

4. The earpiece according to claim 3, further comprising the microphone within the microphone seat.

5. The earpiece according to claim 4, wherein the microphone is at an angle with respect to a longitudinal axis of the earpiece.

6. The earpiece according to claim 1, wherein the elongate member extends from the second end of the earpiece housing.

7. The earpiece according to claim 1, wherein the intermediate module comprises a microphone integrally formed with a part of the intermediate module.

8. The earpiece according to claim 1, further comprising a microphone located at an end of the intermediate module.

9. The earpiece according to claim 1, wherein the intermediate module comprises a printed circuit board, the printed circuit board comprising the primary set of N connector terminals and the secondary set of M connector terminals.

10. The earpiece according to claim 1, wherein the primary set of N connector terminals is at an end of the intermediate module, and wherein the secondary set of M connector terminals is at another end of the intermediate module.

11. The earpiece according to claim 1, wherein the intermediate module comprises a receiver seat for receiving the receiver.

12. The earpiece according to claim 1, wherein the receiver is integrally formed with the intermediate module.

13. The earpiece according to claim 1, wherein the intermediate module has a first side and a second side opposite from the first side, wherein the primary set of N connector terminals are closer to the first side than to the second side of the intermediate module, wherein the secondary set of M connector terminals are closer to the second side than to the first side of the intermediate module.

14. The earpiece according to claim 1, wherein the intermediate module comprises a vent mechanism, and wherein the primary set of N connector terminals surrounds the vent mechanism.

15. The earpiece according to claim 1, wherein the primary set of N connector terminals comprises additional wire connector terminals, and wherein the first secondary connector terminal and the second secondary connector terminal are connected to respective ones of the additional wire connector terminals of the primary set of N connector terminals.

16. An earpiece, comprising:
- an earpiece housing comprising a first end and a second end;
- a receiver located in the earpiece housing;
- an elongate member extending from the earpiece housing, the elongate member comprising a plurality of conductors including a first conductor; and
- an intermediate module located within the earpiece housing, the intermediate module comprising a primary set of N connector terminals and a secondary set of M connector terminals, the primary set of N connector terminals including a wire connector terminal electrically connected to the first conductor of the elongate member, wherein the secondary set of M connector terminals comprises a first secondary connector terminal and a second secondary connector terminal;

wherein the intermediate module comprises a vent mechanism configured to allow fluid communication between opposite sides of the intermediate module when the vent mechanism is in a first state, and to prevent the fluid communication between the opposite sides of the intermediate module when the vent mechanism is in a second state, and wherein the vent mechanism of the intermediate module is surrounded by the primary set of N connector terminals.

17. The earpiece according to claim 16, wherein the primary set of N connector terminals are closer to one of the opposite sides than to the other one of the opposite sides of the intermediate module, wherein the secondary set of M connector terminals are closer to the other one of the opposite sides than to the one of the opposite sides of the intermediate module.

18. An earpiece, comprising:

an earpiece housing comprising a first end and a second end;

a receiver located in the earpiece housing;

an elongate member extending from the earpiece housing, the elongate member comprising a plurality of conductors including a first conductor; and an intermediate module located within the earpiece housing, the intermediate module comprising a primary set of N connector terminals and a secondary set of M connector terminals, wherein the secondary set of M connector terminals comprises a first secondary connector terminal and a second secondary connector terminal;

wherein the primary set of N connector terminals comprises a wire connector terminal and a first primary connector terminal;

wherein first primary connector terminal in the primary set of N connector terminals and the wire connector terminal in the primary set of N connector terminals are all located closer to a first side of the intermediate module than to a second side of the intermediate module, the second side being opposite from the first side.

19. An earpiece, comprising:

an earpiece housing comprising a first end and a second end;

a receiver located in the earpiece housing;

an elongate member extending from the earpiece housing, the elongate member comprising a plurality of conductors including a first conductor; and an intermediate module located within the earpiece housing, the intermediate module comprising a primary set of N connector terminals and a secondary set of M connector terminals, wherein the secondary set of M connector terminals comprises a first secondary connector terminal and a second secondary connector terminal;

wherein the primary set of N connector terminals comprises a wire connector terminal and a first primary connector terminal; and wherein the primary set of N connector terminals also comprises additional wire connector terminals, and wherein the first secondary connector terminal and the second secondary connector terminal are connected to respective ones of the additional wire connector terminals in the primary set of N connector terminals.

* * * * *